R. N. CHAMBERLAIN.
STORAGE BATTERY.
APPLICATION FILED APR. 5, 1905.

930,727.

Patented Aug. 10, 1909.

UNITED STATES PATENT OFFICE.

RUFUS N. CHAMBERLAIN, OF DEPEW, NEW YORK, ASSIGNOR TO GOULD STORAGE BATTERY COMPANY, OF NEW YORK, N. Y.

STORAGE BATTERY.

No. 930,727.        Specification of Letters Patent.        Patented Aug. 10, 1909.

Application filed April 5, 1905. Serial No. 253,966.

*To all whom it may concern:*

Be it known that I, RUFUS N. CHAMBERLAIN, a citizen of the United States, residing at Depew, in the county of Erie and State of New York, have invented a new and useful Improvement in Storage Batteries, of which the following is a specification.

This invention relates to storage batteries or accumulators of the portable type employed in electrically propelled vehicles and for analogous uses.

It is customary, in order to insure perfect electrical connection between the battery elements, to join like plates in each cell by a connecting strip or bar burned or permanently attached to the plates, and also to burn the connections between the plates in adjacent cells. A compact arrangement is of much importance and the cell jars of most portable batteries are therefore arranged in contact side by side, usually in a crate or holder, with the connecting strips for the battery plates located within the confines of the jars. As the greatest plate area gives the largest capacity, the plates are ordinarily made as wide as the internal width of the jar will permit. But with the plates extending from side to side of the jar the connecting strip for one set of plates overhangs the plates of the other set, thus preventing the independent withdrawal of either set. The separators or perforated non-conducting plates ordinarily employed between the positive and negative battery plates are usually of substantially the same width as the battery plates, so that the connecting strips of the plates also overhang the separators and prevent the removal of the same except by first removing all of the battery plates. Not infrequently the separators must be removed and cleaned to correct a ground or leakage in the battery caused by a particle of matter electrically connecting adjacent plates, or to enable a plate to be straightened, or the sediment to be removed from the jar, but this cannot be done without removing all of the plates of a cell and without breaking the burned connection between the plates of adjacent cells. A ground is usually not easily located so that it is sometimes necessary to break and reburn several connections before the trouble is remedied.

The object of this invention is to produce a compact and efficient storage battery or accumulator of large capacity in which the parts are so arranged that each set of plates can be removed without disturbing the other set and that the separators can be removed and replaced without disturbing the plates or the connections between the plates of different cells.

Figure 1:
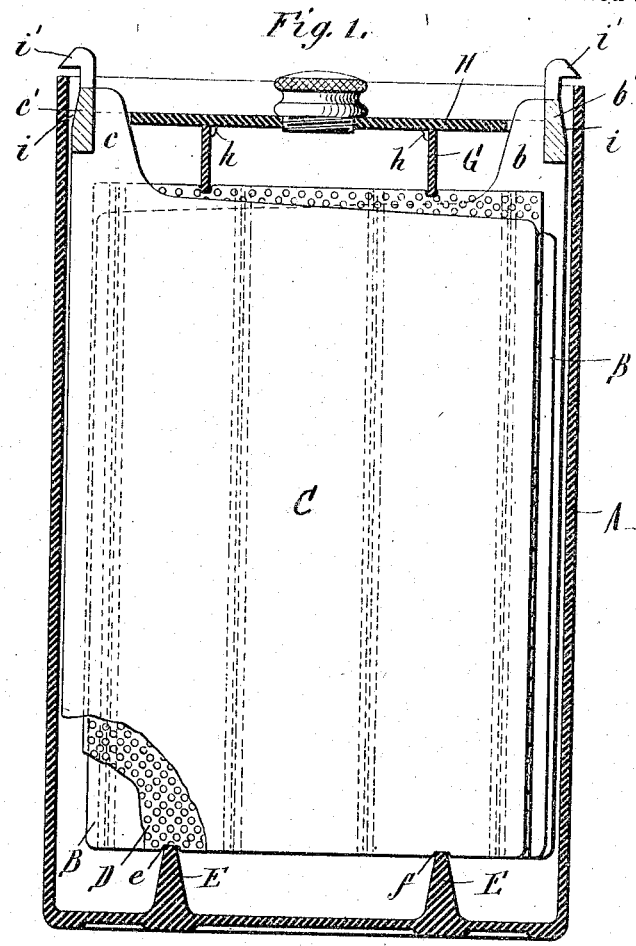
Figure 2:
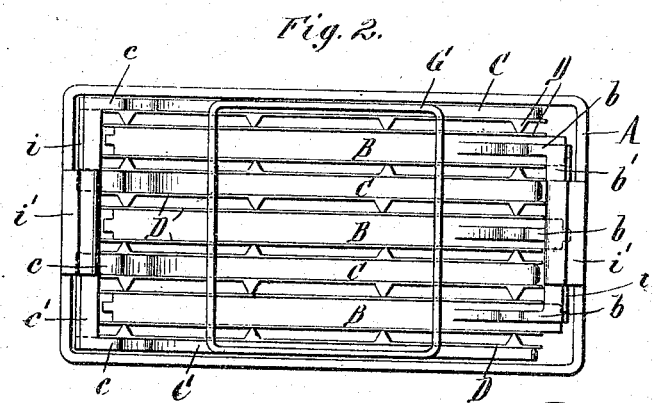

In the accompanying drawings: Figure 1 is a sectional elevation of a storage cell or accumulator embodying the invention. Fig. 2 is a plan view thereof, omitting the cover shown in Fig. 1.

Like letters of reference refer to like parts in both figures.

A represents the containing jar or vessel which may be of any usual shape and may be made of any suitable insulating material, such, for instance, as hard rubber or gutta percha. B represents the positive plates, C the negative plates, and D the separators between the plates. All of these parts may be in their general features of any known or suitable construction.

Each positive plate is provided at one side with the usual upwardly extending lug $b$, and each negative plate has a similar lug $c$, the lugs of the positive plates being located at one side of the cell and joined by a connecting strip or bar $b'$, while the lugs of the negative plates are located at the opposite side of the cell and joined by a similar connecting strip or bar $c'$. These connecting strips are arranged within the jar, to permit a close arrangement of the several cells of a battery; and are preferably arranged on edge or with their smallest dimension horizontally, to permit the use of strips of the required size while occupying the least horizontal space in the jar. The battery plates are narrower than the internal diameter or dimension of the jar and are arranged in staggered order, that is, the upright edges of the positive plates, which are joined by the connecting bar $b'$, extend toward the wall of the jar beyond the adjacent side edges of the negative plates, while the opposite side edges of the negative plates, which are joined by the connecting bar $c'$, similarly project beyond the adjacent edges of the positive plates. The plates of each set terminate at a sufficient distance from that side of the jar at which the connecting strip for the other set of plates is located, to enable either set of plates to be lifted vertically out of the jar without contact with the connecting strip for the other set of plates.

As the separators are required to be interposed only between those portions of the plates of opposite sign that are opposite to each other, the separators are made of a width slightly less than the horizontal distance between the connecting strips of the two sets of plates.

The described arrangement of the plates makes it possible to employ separators which are narrow enough to be inserted and removed between the connecting bars *b' c'*, without disturbing either set of plates. The staggered arrangement of the plates also permits the use of larger plates, giving greater surface area, than would otherwise be possible in an arrangement permitting the independent removal of the sets of battery plates and the separators. Any one or all of the separators can be removed, cleaned and returned without disturbing the plates in the cell or the connections between the plates of different cells.

E represents the usual insulated supports at the bottom of the jar for holding the plates above the bottom to provide a space beneath the plates for sediment and detached particles of the active material. In order to hold the plates and separators in the stated relation the bottom edges of the plates and separators are notched at *e* and *f*, respectively, to engage these supports. The upper ends of the separators are also preferably held from relative movement by some suitable means, that shown consisting of a hollow rectangular piece or frame G of insulating material arranged on edge upon the separators and seated in notches in their upper edges which are located above the upper edges of the battery plates. The retaining piece G serves as a support for the usual cover plate H for the jar and is held from shifting by depending lugs *h* on the cover plate or other means.

The cover plate H is situated between the upwardly projecting lugs *b* and *c* of the positive and negative plates, being thereby held from shifting horizontally and at the same time acting to hold the one set of plates from lateral movement independently of the other. All of the parts are thus held from movement relative to each other and, owing to their combined weight, especially when the plates of different cells are connected, there is little liability of the movement of the parts in the jar. The outer faces of the connecting strips *b c*, see Fig. 1, are beveled at *i* so as to diverge upwardly from the walls of the jar, and thereby afford sufficient space between the walls of the jar and the connecting strips and the connectors *i'* rising therefrom to prevent capillary action and the consequent wasting of the electrolyte. As the battery plates rest on the supports E the connectors *i'* need not bear on the top edges of the jar and, as shown, are spaced therefrom to further prevent capillary action between the same and the walls of the jar.

The devices described for holding the plates and separators in position are efficient and desirable, but any other suitable instrumentalities may be employed for this purpose.

I claim as my invention:

1. In a storage battery cell, the combination of a containing vessel, a set of positive plates and a set of negative plates, each connected by a transverse bar which is arranged within the cell and laterally beyond the adjacent upright edges of the plates of the opposing set, and separator plates interposed between opposing plates and of less width than the distance between the bars, whereby each set of plates can be raised from the vessel without disturbing the opposing set and each separator plate can be removed without disturbing the battery plates, substantially as set forth.

2. In a storage battery cell, the combination of a containing vessel, a set of positive plates and a set of negative plates, each connected by a transverse bar which is arranged within the cell and laterally beyond the adjacent upright edges of the plates of the opposing set, the plates of each set being of greater width than the distance between said connecting bars, and separators interposed between the opposing plates, said separators being of less width than the distance between said bars and disconnected from said plates, whereby each set of plates can be raised from the vessel without disturbing the opposing set and each separator can be removed without disturbing said plates, substantially as set forth.

3. In a storage battery cell, the combination of a containing vessel, a set of positive plates and a set of negative plates, each set connected by a transverse bar which is arranged within the vessel and laterally beyond the adjacent upright edges of the plates of the opposing set, the plates of each set being of greater width than the distance between said connecting bars, the bars having terminal lugs which extend upwardly out of the upper end of the vessel, and separator plates interposed between opposing plates and of less width than the distance between the bars, substantially as set forth.

4. In a storage battery cell, the combination of a containing vessel, and a set of positive plates and a set of negative plates, each set connected by a bar which is arranged within the vessel adjacent to the inner side thereof and which has its outer side receding upwardly from the inner side of the vessel, substantially as set forth.

5. In a storage battery cell, the combination of a containing vessel, a set of positive plates and a set of negative plates, each set connected by a bar which is arranged within the vessel adjacent to the inner side thereof and which has its outer side receding upwardly from the inner side of the vessel and is provided with a terminal lug which extends upwardly from the upper portion of the bar and is spaced from the inner side of the vessel, substantially as set forth.

Witness my hand this 1st day of April, 1905.

RUFUS N. CHAMBERLAIN.

Witnesses:
C. W. PARKER,
A. L. McGEE.